US008812159B2

(12) United States Patent
Maehara et al.

(10) Patent No.: US 8,812,159 B2
(45) Date of Patent: Aug. 19, 2014

(54) ROBOT SYSTEM

(75) Inventors: Shinichi Maehara, Fukuoka (JP);
Hirokazu Kariyazaki, Fukuoka (JP);
Takahiro Maeda, Fukuoka (JP)

(73) Assignee: Kabushiki Kaisha Yaskawa Denki,
Kitakyushu-Shi (JP)

( * ) Notice: Subject to any disclaimer, the term of this patent is extended or adjusted under 35 U.S.C. 154(b) by 601 days.

(21) Appl. No.: 13/047,818

(22) Filed: Mar. 15, 2011

(65) Prior Publication Data

US 2011/0224826 A1   Sep. 15, 2011

(30) Foreign Application Priority Data

Mar. 15, 2010  (JP) ................... 2010-057415
Nov. 4, 2010   (JP) ................... 2010-247097

(51) Int. Cl.
*G05B 19/04*       (2006.01)
*G05B 19/18*       (2006.01)

(52) U.S. Cl.
USPC ........... 700/255; 700/245; 700/253; 700/258;
318/568.11; 318/568.12; 318/568.18; 318/568.2;
318/568.22

(58) Field of Classification Search
USPC ............. 700/245, 253, 255, 258; 318/568.11,
318/568.12, 568.18, 568.2, 568.22
See application file for complete search history.

(56) References Cited

U.S. PATENT DOCUMENTS

| 6,166,504 | A    | 12/2000 | Iida et al. |
| 6,917,856 | B2 * | 7/2005  | Murata .......................... 700/255 |
| 7,514,893 | B2 * | 4/2009  | Moen et al. ............... 318/568.12 |
| 7,904,206 | B2 * | 3/2011  | Shioda et al. ................. 700/250 |
| 8,001,697 | B2 * | 8/2011  | Danielson et al. ............... 33/503 |
| 8,028,432 | B2 * | 10/2011 | Bailey et al. .................... 33/503 |
| 8,171,650 | B2 * | 5/2012  | York et al. ....................... 33/503 |
| 8,180,488 | B2   | 5/2012  | Kariyazaki et al. |
| 8,271,135 | B2 * | 9/2012  | Shioda et al. ................. 700/257 |

(Continued)

FOREIGN PATENT DOCUMENTS

| DE | 102007037078 | 2/2009 |
| JP | 63-077692    | 4/1988 |

(Continued)

OTHER PUBLICATIONS

Japanese Office Action for corresponding JP Application No. 2010-247097, Jul. 31, 2012.

(Continued)

*Primary Examiner* — Khoi Tran
*Assistant Examiner* — Jaime Figueroa
(74) *Attorney, Agent, or Firm* — Mori & Ward, LLP

(57) ABSTRACT

A process includes defining, in a memory, arm-occupied regions including robot arms and a workpiece and tool attached to a robot wrist, a virtual safety protection barrier with which the arms are not allowed to come into contact, and movable ranges of robot axes; estimating the coasting angle of each robot axis for which the axis will coast when the robot is stopped due to an emergency stop while moving to a next target position, from an actually measured amount of coasting and the like; determining a post-coasting predicted position of the robot by adding the estimated coasting angles to the next target position; checking whether or not the arm-occupied regions at the post-coasting predicted position will come into contact with the virtual safety protection barrier, or whether or not the robot axes are within the movable ranges; and performing control to stop the robot immediately upon detection of abnormality.

14 Claims, 11 Drawing Sheets

(56) References Cited

U.S. PATENT DOCUMENTS

| | | | | |
|---|---|---|---|---|
| 8,276,286 B2* | 10/2012 | Bailey et al. | ............... | 33/503 |
| 8,284,407 B2* | 10/2012 | Briggs et al. | ............... | 356/614 |
| 2004/0249508 A1* | 12/2004 | Suita et al. | ............... | 700/245 |
| 2006/0052901 A1 | 3/2006 | Nihei et al. | | |
| 2010/0292843 A1* | 11/2010 | Kariyazaki et al. | ............ | 700/264 |

FOREIGN PATENT DOCUMENTS

| | | |
|---|---|---|
| JP | 03-060993 | 3/1991 |
| JP | 03-071988 | 3/1991 |
| JP | 04-008489 | 1/1992 |
| JP | 07-096481 | 4/1995 |
| JP | 60-066484 U | 5/1995 |
| JP | 2004-322244 | 11/2004 |
| JP | 2006-068857 | 3/2006 |
| WO | WO 2009/072383 | 6/2009 |

OTHER PUBLICATIONS

Extended European Search Report for corresponding EP Application No. 11157739.1-1239, Oct. 23, 2012.

\* cited by examiner

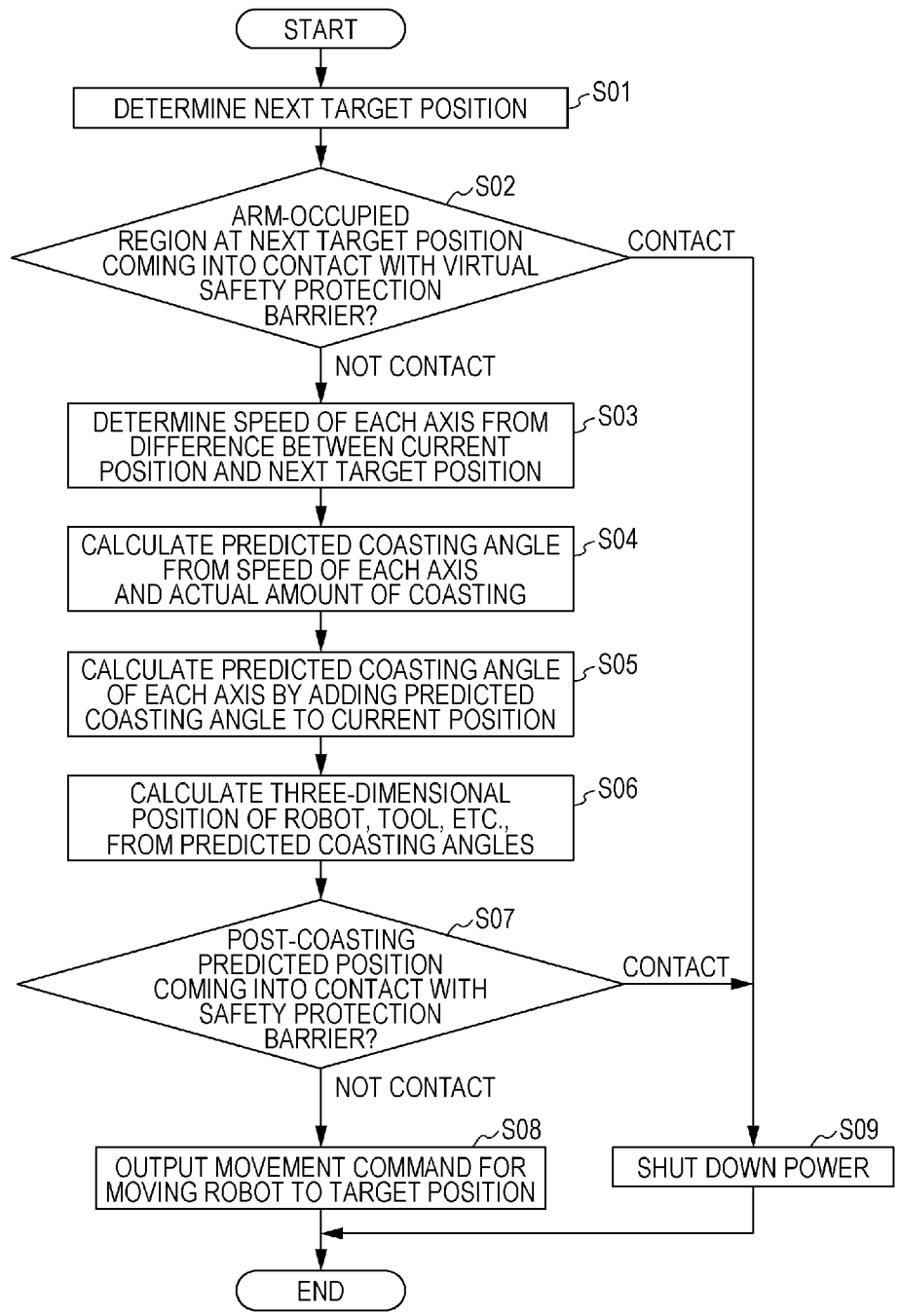

ROBOT SYSTEM

CROSS-REFERENCE TO RELATED APPLICATION

The present application claims priority under 35 U.S.C. §119 to Japanese Patent Applications No. 2010-057415, filed on Mar. 15, 2010 and Japanese Patent Applications No. 2010-247097, filed on Nov. 4, 2010. The contents of these applications are incorporated herein by reference in their entirety.

BACKGROUND OF THE INVENTION

Field of the Invention

The present invention relates to a robot system that limits the movement range of a robot.

In robot systems of the related art, as described in Japanese Unexamined Patent Application Publication No. 2004-322244, a region where movement of a robot is restricted is defined by a "virtual safety barrier" that is stored in a memory, and at least two three-dimensional spatial regions in which a workpiece and a portion of a robot, including a tool, are located are defined. As a result of matching between predicted positions of the three-dimensional spatial regions, which are obtained by trajectory calculation, and the virtual safety barrier, if any of the predicted positions comes into contact with the virtual safety barrier, control is performed to cause the robot to stop.

SUMMARY OF THE INVENTION

According to one aspect of the present invention, an arm-occupied region of a robot and a virtual safety protection barrier with which the arm-occupied region is not allowed to come into contact are defined. When a target position of a tip of the robot is calculated for each calculation period and a movement command for moving the each axis of the robot is generated, it is checked whether or not the arm-occupied region at a target position of the tip of the robot in a subsequent calculation period will come into contact with the virtual safety protection barrier. If it is determined that the arm-occupied region will come into contact with the virtual safety protection barrier, control is performed to cause the robot to stop moving. If it is determined that the arm-occupied region will not come into contact with the virtual safety protection barrier, a coasting angle of each axis of the robot, which is an angle for which the axis of the robot will coast when the robot is stopped due to an emergency stop during movement of the robot in accordance with a movement command for moving the tip of the robot to the target position in the subsequent calculation period, is estimated from an actual coasting angle measured in advance and from a mechanical delay time. A post-coasting predicted position of each axis of the robot, which is a position at which the axis is predicted to stop after coasting, is determined by adding a coasting angle of the axis to the movement command for moving the axis in the subsequent calculation period.

According to another aspect of the present invention, a robot system includes a robot, and a robot controller configured to control the robot. The robot controller includes a target position calculator configured to determine a movement target position to which a workpiece or a tool attached to an arm of the robot or to a wrist of the robot moves for each calculation period and to generate a movement command for moving each axis of the robot, and a driver configured to make the robot move in accordance with the movement command. The robot system further includes a memory configured to store an arm-occupied region based on the workpiece or the tool and a virtual safety protection barrier that is set so as to define a region including the robot and the arm-occupied region; a current position detector configured to read the current motor position from a position detector provided for each axis of the robot, determine the current position of the robot from the current motor positions, and store the current motor positions and the current position of the robot; a movement-prohibited region entry monitoring unit configured to check wither or not the arm-occupied region at the movement target position of the workpiece or the tool determined by the target position calculator will come into contact with the virtual safety protection barrier, and to output a stop request for stopping movement of the robot if it is determined that the arm-occupied region will come into contact with the virtual safety protection barrier; and a post-coasting-predicted-position calculator configured to estimate a coasting angle of each axis of the robot, which is an angle for which the axis of the robot will coast when the robot is stopped due to an emergency stop during movement of the robot to the target position of the workpiece or the tool, from an actual coasting angle measured in advance and from a mechanical delay time, and to determine a post-coasting predicted position of each axis of the robot and the position of the workpiece or the tool that will stop after coasting at the post-coasting predicted position of each axis, by adding the estimated coasting angle of each axis to the movement command for each axis. The robot system further includes a virtual safety protection barrier contact monitoring unit configured to check whether or not the arm-occupied region at the determined position will come into contact with the virtual safety protection barrier, and to output a stop request for stopping movement of the robot if it is determined that the arm-occupied region will come into contact with the virtual safety protection barrier.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a flowchart of the method for limiting movement of a robot according to the first embodiment;

DESCRIPTION OF THE EMBODIMENTS

Figure 1:
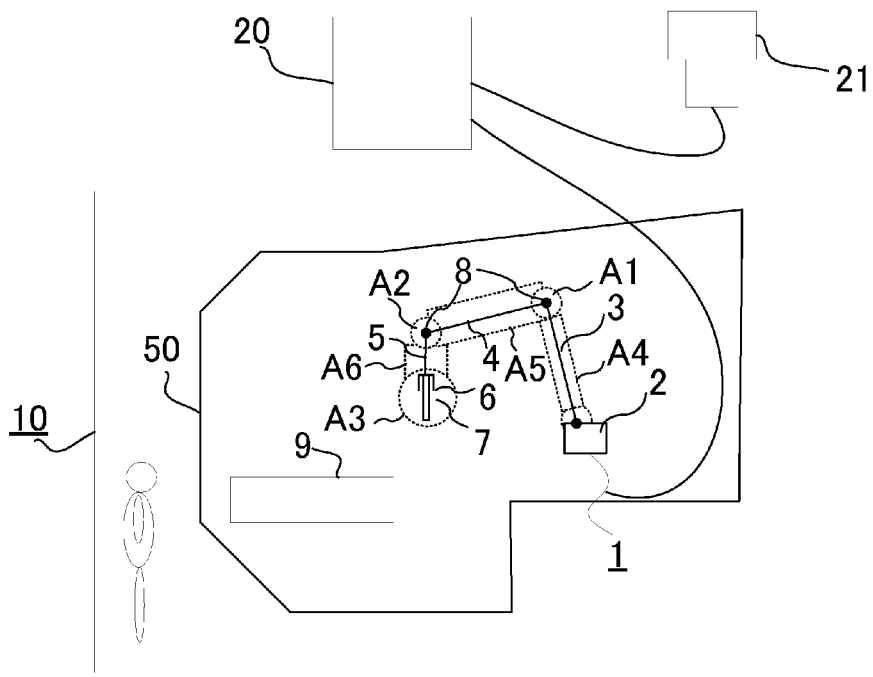
FIG. 1 illustrates a method for limiting movement of a robot and a robot system including an apparatus for the method according to a first embodiment.

Embodiments will now be described with reference to the accompanying drawings, wherein like reference numerals designate corresponding or identical elements throughout the various drawings.

First Embodiment

A method for limiting movement of a robot and a robot system including an apparatus for the method according to a first embodiment will be described with reference to FIG. 1. A physical safety protection barrier 10 is disposed on a floor of a factory, and a robot 1 is placed inside the safety protection barrier 10.

In the illustrated example, the robot 1 includes a base 2 and three arms 3, 4, and 5. The arm 5 is provided with a gripper 6, and a tool 7 is attached to the arm 5 with the gripper 6 therebetween. Examples of the tool 7 include a welding torch used for arc welding, a welding gun used for spot welding, and a hand for transporting an object. The arms 3, 4, and 5 are connected to each other via joints 8. A workpiece 9 may be an object to be welded or an object to be transported. Inside the safety protection barrier 10, for example, the robot 1 performs operations such as welding the workpiece 9 and performing assembly work using transported objects.

A necessary signal is sent to the base 2 from a controller 20. The arms 3, 4, and 5 move in a predetermined manner in accordance with a predetermined operation program. The gripper 6 or the tool 7 moves along a desired trajectory.

A teach pendant 21 is connected to the controller 20, and may be used to perform operations such as teaching of the robot 1 and rewriting of the operation program.

Before the operation of the robot 1 which has been installed and placed in position, a virtual safety protection barrier 50 for the robot 1 is set. The setting of the virtual safety protection barrier 50 may be performed any time when changed in addition to when the robot 1 is placed in position. The virtual safety protection barrier 50 is set to define a space in the shape of a polygonal parallelepiped. The setting of the virtual safety protection barrier 50 may be performed by inputting the numerical coordinate values of the vertices of the polygonal parallelepiped using the teach pendant 21, or by operating the teach pendant 21 to move the control points of the robot 1 and specifying the positions of the vertices of the polygonal parallelepiped. Alternatively, data for setting the virtual safety protection barrier 50 may also be loaded into the controller 20 from the teach pendant 21 using a personal computer or the like. The defined virtual safety protection barrier 50 is stored in a memory of the controller 20. Virtual safety protection barriers 50 set to define a plurality of regions may also be used. The virtual safety protection barriers can individually be set active or inactive.

Further, spatial regions occupied by the arms 3, 4, and 5 of the robot 1 and by the tool 7 are defined as arm-occupied regions A1, A2, A3, A4, A5, and A6.

First, arms 3, 4, and 5 are defined as cylindrical regions A4, A5, and A6, respectively, with a predetermined radius whose centers of axes are straight lines connecting the joints 8 to each other. The regions A1 and A2, which include the joints 8 of the robot 1, are each defined as a spherical region with a predetermined radius, the center of which is a point on the axis of the corresponding one of the joints 8. The point on the axis of each of the joints 8 may generally be an intersection of each of the "straight lines connecting the joints 8 to each other", which are used for defining the regions A4, A5, and A6, and the axis of the corresponding one of the joints 8. The region A3, which includes the gripper 6 and the tool 7 attached to the tip of the arm 5, is defined as a spherical region with a predetermined radius. The defined arm-occupied regions A1 to A6 are also stored in the memory of the controller 20.

Any of the arm-occupied regions A1 to A6 may be a spherical or cylindrical region with a certain radius. If each of the arm-occupied regions A1 to A6 is defined as a spherical or cylindrical region with a larger radius, a larger detection range may be obtained accordingly. However, the virtual safety protection barrier 50 described above may be required to be set as a larger region, leading to reduced space efficiency. Alternatively, movement of the arms 3, 4, and 5 may be restricted.

Figure 2:
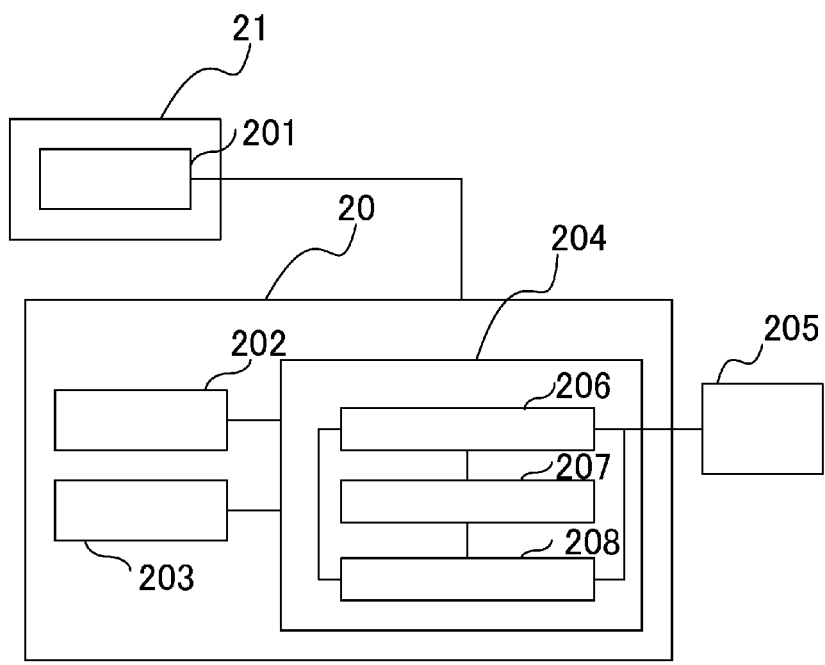
FIG. 2 is a block diagram illustrating a mechanism implementing the method for limiting movement of a robot according to the first embodiment.

FIG. 2 is a block diagram illustrating an example of a robot control mechanism including the controller 20. In accordance with an operation performed on the teach pendant 21 by an operator, a teach/operation unit 201 calls and executes an operation program, and operates a robot for teaching. The teach/operation unit 201 also performs operations such as storing teaching data (the operation program and other operation-related information) in a teaching data storage area 202 and storing various parameters in a parameter storage area 203.

The parameter storage area 203 also stores other values such as the dimensions of arm parts, which are necessary for interpolation calculation, specifications of joint axes, such as the reduction ratios and motor constants, which are necessary for moving the axes of the robot 1, the radii of the arm-occupied regions A1 to A6, and the coordinate values for defining the virtual safety protection barrier 50.

When the operator calls and executes the operation program or operates the robot for teaching, the teach/operation unit 201 sends a robot movement command request to a movement command generator 204. In the movement command generator 204, in response to the robot movement command request, a next target position calculator 206 calculates a next target position for each interpolation period defined in the operation program. A virtual safety protection barrier contact monitoring unit 208 checks whether or not the arm-occupied regions A1 to A6 at the calculated next target position will come into contact with the virtual safety protection barrier 50. Further, a post-coasting-predicted-position calculator 207 calculates a position (post-coasting predicted position) at which the robot 1 will stop after coasting when stopped due to an emergency stop while moving to the next target position. The virtual safety protection barrier contact monitoring unit 208 checks whether or not the arm-occupied regions A1 to A6 at the calculated post-coasting predicted position will come into contact with the virtual safety protection barrier 50. The next target position calculator 206 sends command values for the respective axes of the robot 1 for moving the robot 1 to the calculated position to a driver 205.

However, if the virtual safety protection barrier contact monitoring unit 208 detects potential contact with the virtual safety protection barrier 50, a stop request is sent to the driver 205.

The driver 205 causes the axes of the robot 1 to move in accordance with the command values sent from the movement command generator 204. Upon receipt of a stop request, however, the driver 205 does not permit the robot 1 to move but causes the robot 1 to stop.

Coasting information, which is necessary for the calculation of an amount of coasting of the robot 1, is also stored in the teaching data storage area 202.

Figure 3A:
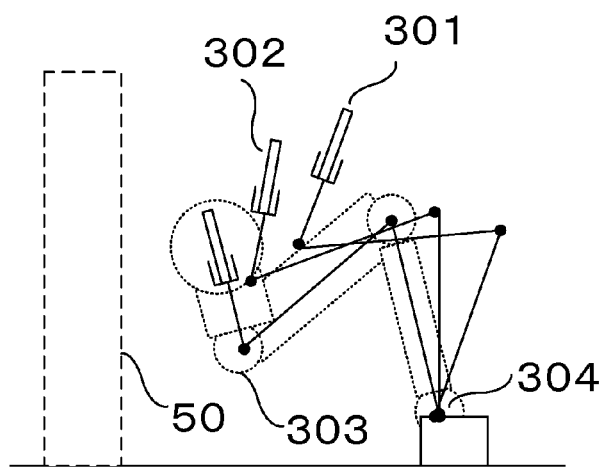
FIGS. 3A and 3B are diagrams illustrating the method for limiting movement of a robot and movement of a robot having an apparatus for the method according to the first embodiment.
Figure 3B:
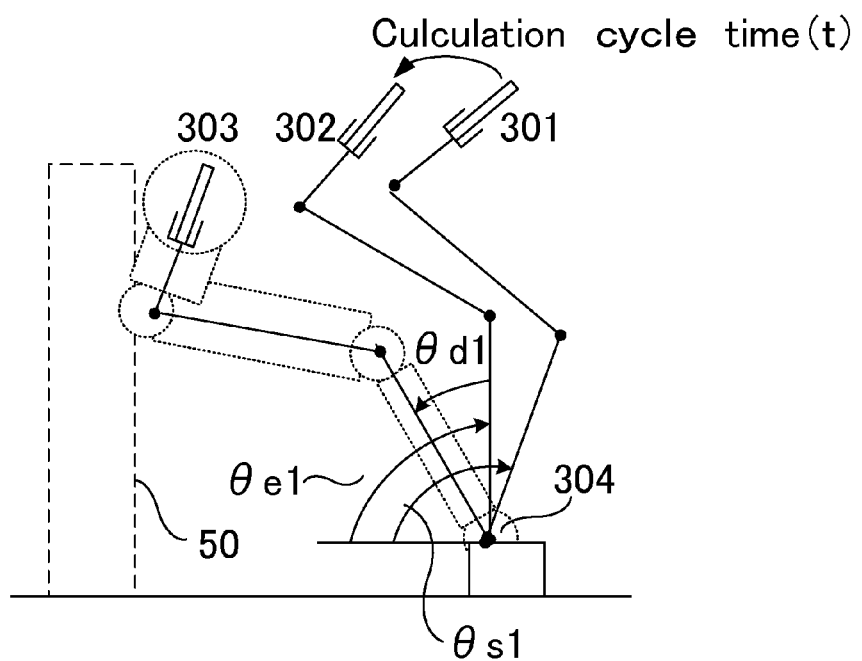

A basic concept of movement of the robot 1 according to this embodiment will be described with reference to FIGS. 3A and 3B.

The robot 1 is moving from a current position 301 to a next target position 302. Here, if the robot 1 is stopped due to an emergency stop, the respective axes of the robot 1 coast to some extent in accordance with the load thereon, and then stop. It may be possible to predict the coasting angle of each axis, add the predicted coasting angle to the next target position, and determine a post-coasting predicted position 303. In FIG. 3B, $\theta_{s1}$ represents the angle of a first axis 304 at the current position 301, $\theta_{e1}$ represents the angle of the first axis 304 at the next target position 302, and $\theta_{d1}$ represents the coasting angle of the first axis 304 in accordance with the load at the next target position 302 when the robot 1 is stopped due to an emergency stop. The post-coasting predicted position 303 can be determined by calculating $\theta_{e1}+\theta_{d1}$. If the arm-occupied regions A1 to A6 at the post-coasting predicted position 303 are considered and any of them will come into contact with the virtual safety protection barrier 50, the robot 1 is stopped before the robot 1 is moved to the next target position 302, thus preventing the robot 1 from coming into contact with the virtual safety protection barrier 50 even if the robot 1 coasts.

A process for implementing movement of the robot 1 restricted so as not to interfere with the virtual safety protection barrier 50, which is performed by the movement command generator 204, will be described with reference to a flowchart of FIG. 4. A method according to the present invention will be described step by step with reference to FIGS. 2 to 4.

In the following description, it is assumed that the robot 1 has n axes. Basically, the respective steps are repeatedly performed for each of the first to n-th axes in a similar manner. The index i represents the axis number of each axis.

In step S01, the next target position calculator 206 calculates the next target position (302 in FIGS. 3A and 3B) for each calculation period. The next target position also includes the angle of each axis of the robot 1. Then, the process proceeds to step S02.

In step S02, it is checked whether or not the arm-occupied regions A1 to A6 at the next target position determined in step S01 will come into contact with the virtual safety protection barrier 50. The check operation is performed by the virtual safety protection barrier contact monitoring unit 208.

Figure 5:
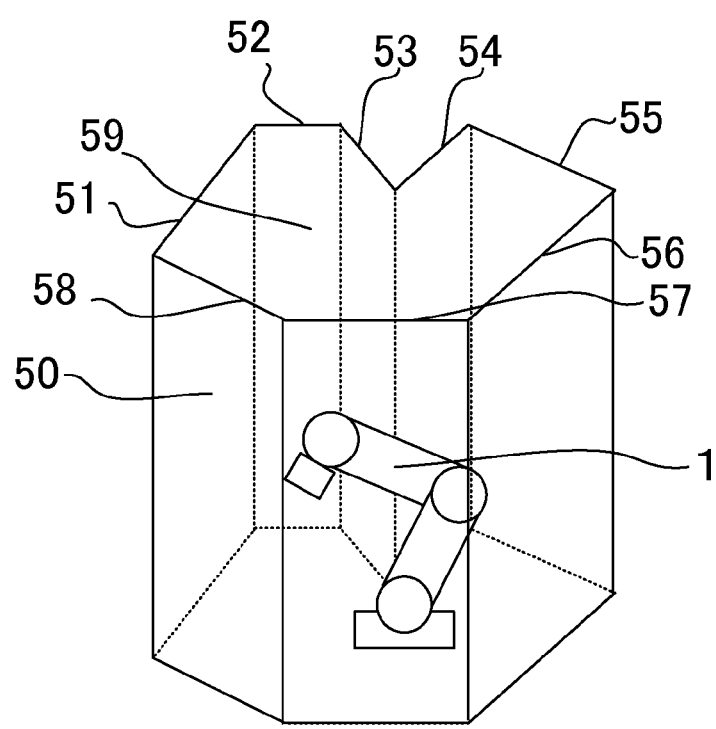
FIG. 5 is a diagram illustrating a method for defining a movable region according to the first embodiment.

Any of various specific contact monitoring methods may be used. Here, it is assumed that a method for monitoring contact between line segments of the polygonal parallelepiped of the virtual safety protection barrier 50 and the spherical or cylindrical regions including the robot 1 and the tool 7 is used. As illustrated in FIG. 5, the virtual safety protection barrier 50 may be configured into a polygon 59 with a certain height, which is defined by line segments 51 to 58. A method for determining the distance between each of the line segments 51 to 58 and each of the arm parts of the robot 1 and determining whether or not the both interfere with each other may be used.

If virtual safety protection barriers 50 are defined as a plurality of regions, all the virtual safety protection barriers that are set active to monitor are checked in a similar manner. If potential contact with one of them is detected, it is determined that "contact" will occur.

If it is determined that "contact" will occur, the process proceeds to step S09, and the power is disconnected. Otherwise, the process proceeds to step S03.

In step S03, the speed $\omega_i$ of each axis of the robot 1 is determined from the difference between the current position and the next target position and from the calculation period time t. The calculation of the speed $\omega i$ is performed by the post-coasting-predicted-position calculator 207. The speed $\omega_1$ of the first axis 304 in FIGS. 3A and 3B can be determined using, for example, the following equation:

$$\omega_1=(\theta_{e1}-\theta_{s1})/t,$$

where $\theta_{s1}$ and $\theta_{e1}$ are the angles described with reference to FIGS. 3A and 3B.

In step S04, the post-coasting-predicted-position calculator 207 calculates the amount of coasting of each axis of the robot 1 at the next target position. The amount of coasting of a robot may change depending on the mass and operation speed of an arm or the type of the speed reducer or brake used in the robot. Thus, an actual amount of coasting $\theta_{DiMAX}$ obtained when a robot, which holds at least a maximum load, is stopped due to an emergency stop at a maximum speed $\omega_{iMAX}$ of each axis under the maximum load is measured in advance using an actual robot system, and information on the measured actual amount of coasting $\theta_{DiMAX}$ is stored in the parameter storage area 203.

A variable coasting angle $\theta_{ds1}$ of the first axis 304 at the speed $\omega_1$ is calculated from the speed $\omega_1$ of the first axis 304 and the actual amount of coasting $\theta_{D1MAX}$, using the following equation:

$$\theta_{ds1}=(\omega_1/\omega_{1MAX})\times\theta_{D1MAX}.$$

Further, if a delay time of relay or the like occurs until the robot 1 stops, an amount of fixed-delay coasting $\theta_{dfi}$ caused by a fixed delay is calculated from the fixed delay time $t_d$ and the speed $\omega_i$ of each axis, using the following equation:

$$\theta_{df1}=t_d\times\omega_1.$$

Therefore, a predicted amount of coasting $\theta_{d1}$ can be determined by adding the variable amount of coasting $\theta_{ds1}$ and the amount of fixed-delay coasting $\theta_{df1}$ together:

$$\theta_{d1}=\theta_{ds1}+\theta_{df1}.$$

In step S05, the coasting angles of the respective axes, which are determined in step S04, are added to the current position to calculate "predicted coasting angles of the respective axes".

In step S06, a forward transform is performed using the "predicted coasting angles of the respective axes" calculated in step S05 to calculate a "post-coasting predicted position". The post-coasting predicted position determined here is a position at which the robot 1 is predicted to stop when the robot 1 is stopped due to an emergency stop at the next target position.

In step S07, it is checked whether or not the post-coasting predicted position 303 will come into contact with the virtual safety protection barrier 50. The check operation may be performed by the virtual safety protection barrier contact monitoring unit 208 using a method similar to that in step S02.

If it is determined that "contact" will occur, the process proceeds to step S09, and the power is stopped. Otherwise, the process proceeds to step S08.

In step S08, a movement command for moving the robot 1 to the next target position calculated by the next target position calculator 206 is output to the driver 205 to make the robot 1 move.

In step S09, the virtual safety protection barrier contact monitoring unit 208 sends a stop request to the driver 205. In response to the stop request, the driver 205 makes the robot 1 stop moving. Further, a message indicating the reason for making the robot 1 stop is displayed on a display of the teach pendant 21.

With the above procedure, even when an emergency stop occurs and the robot 1 coasts, the robot 1 can be prevented from coming into contact with the virtual safety protection barrier 50 or from moving beyond the virtual safety protection barrier 50.

Second Embodiment

The method for limiting movement of a robot according to the first embodiment may be implemented by a control program for controlling the robot. In order to further enhance security and reliability, an apparatus configured to monitor contact between a robot and a virtual safety protection barrier and to control the robot to stop moving when the robot will come into contact with the virtual safety protection barrier may be independently provided.

The configuration of a second embodiment in which the apparatus configured to perform the above monitoring and stop control operations is provided as an independent unit will be described with reference to FIG. 6.

Figure 6:
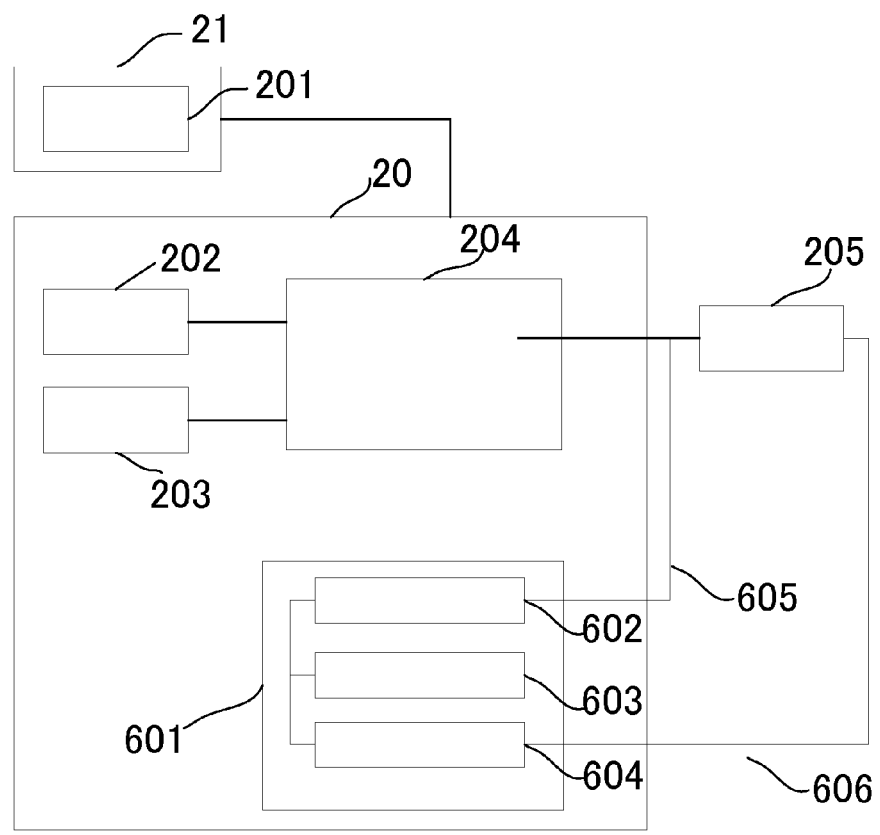
FIG. 6 is a block diagram illustrating a mechanism implementing a method for limiting movement of a robot according to a second embodiment.

FIG. 6 illustrates a configuration in which a movement region monitoring apparatus 601 is added to the system illustrated in FIG. 2. In the movement region monitoring apparatus 601, a current position detector 602 reads motor positions 605 of the respective axes for each determined monitoring period, which are supplied from the driver 205, and determines the current position of the robot 1 (the position of the workpiece 9 or the tool 7) from the motor positions 605. A virtual safety protection barrier contact monitoring unit 604 checks whether or not the robot 1 at the current position will come into contact with the virtual safety protection barrier 50. A coasting-based-predicted-position calculator 603 calculates, based on information regarding the motor positions 605 read by the current position detector 602, a position at which the robot 1 will stop after coasting when stopped due to an emergency stop at this time. The virtual safety protection barrier contact monitoring unit 604 checks whether or not the robot 1 at the calculated post-coasting predicted position will come into contact with the virtual safety protection barrier 50.

Upon detection of potential contact with the virtual safety protection barrier 50, the virtual safety protection barrier contact monitoring unit 604 outputs an emergency stop command 606 such as a drive power supply shutdown signal to the driver 205.

Figure 7:
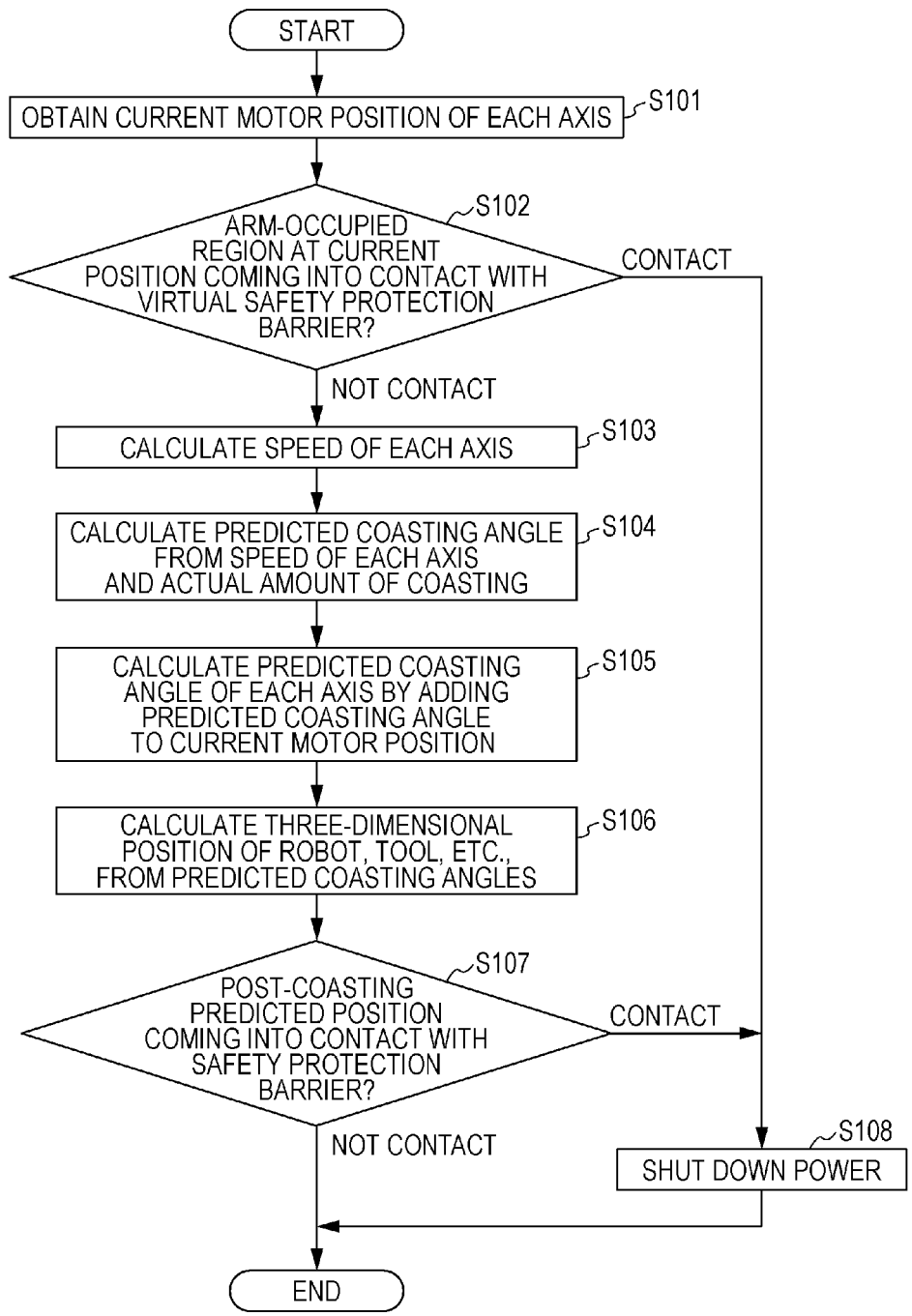
FIG. 7 is a flowchart illustrating the method for limiting movement of a robot according to the second embodiment.

FIG. 7 is a flowchart of a process for limiting movement of the robot 1 so as not to interfere with the virtual safety protection barrier 50 in the system configuration illustrated in FIG. 6. A method according to the second embodiment will be described step by step with reference to FIGS. 6 and 7.

In step S101, the current position detector 602 reads the motor positions 605 of the respective axes of the robot 1, and then determines the current position of the robot 1 from the read motor positions 605. For subsequent processing, the current positions of the motors of the respective axes (current position) are stored together with the previous positions that have been read in the previous operation. Then, the process proceeds to step S102.

In step S102, the virtual safety protection barrier contact monitoring unit 604 checks whether or not the arm-occupied regions A1 to A6 illustrated in FIG. 1 at the current position of the robot 1 determined in step S101 will come into contact with the virtual safety protection barrier 50. A method similar to the specific contact monitoring method used in step S02 in the flowchart of FIG. 4 according to the first embodiment may be used. If it is determined that "contact" will occur, the process proceeds to step S108, and the power is shut down.

In step S103, the speed $\omega_i$ of each axis of the robot 1 is determined from the difference between the precious positions and current positions of the motors of the respective axes and from the monitoring period time. The index i represents the axis number of each axis. Then, the process proceeds to step S104.

In step S104, the coasting angles of the respective axes relative to the current positions of the motors of the respective axes when the robot 1 is stopped due to an emergency stop are calculated. The calculation of the coasting angles is performed by the coasting-based-predicted-position calculator 603. A method that is the same as or similar to that in step S04 in FIG. 4 according to the first embodiment may be used. Then, the process proceeds to step S105.

In step S105, the coasting angles of the respective axes determined in step S104 are added to the current positions of the motors of the respective axes to calculate "predicted coasting angles". The calculation of the predicted coasting angles is performed by the coasting-based-predicted-position calculator 603. A calculation method that is the same as or similar to that in step S05 in FIG. 4 according to the first embodiment may be used. Then, the process proceeds to step S106.

In step S106, a forward transform is performed using the "predicted coasting angles of the respective axes" calculated in step S105 to calculate a "post-coasting predicted position". The post-coasting predicted position determined here is a position at which the robot 1 is predicted to stop when the robot 1 is stopped due to an emergency stop at the next target position.

In step S107, it is checked whether or not the post-coasting predicted position will come into contact with the virtual safety protection barrier 50. The check operation may be performed using a method similar to that in step S102. If it is determined that "contact" will occur, the process proceeds to step S108, and the power is shut down. Otherwise, the monitoring process in the current monitoring period ends.

In step S108, an emergency stop request is sent to the driver 205. With the above configuration and procedure, if an abnormality command is transmitted to the robot 1 due to the failure of the movement command generator 204, the robot 1 can be stopped without moving beyond the virtual safety protection barrier 50 after coasting.

Third Embodiment

The method for limiting movement of a robot according to the first and second embodiments is designed to predict an amount of coasting to prevent the robot from coming into contact with a virtual safety protection barrier or from moving beyond the virtual safety protection barrier. The concept of the method can also be applied to the restriction of the movement range of the axes of the robot.

Figure 8:
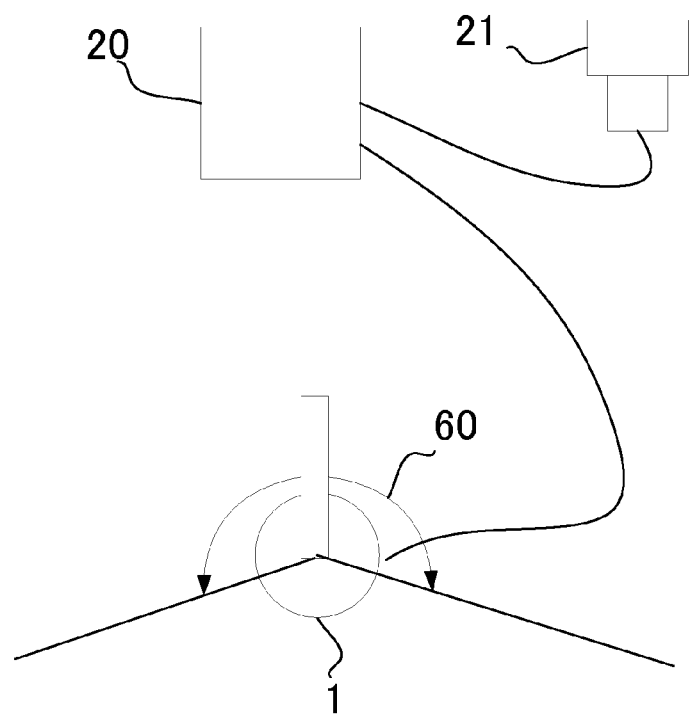
FIG. 8 illustrates a method for limiting movement of the axes of a robot and a robot system including an apparatus for the method according to the second embodiment.

A method for limiting movement of a robot and a robot system including an apparatus for the method according to a third embodiment will be described with reference to FIG. 8. In general, a mechanical safety apparatus such as a mechanical stopper is attached to each axis of a robot, and is configured to limit movement of the corresponding one of the axes of the robot. In place of the use of mechanical stoppers, a movable range 60 of each axis may be defined and monitored. In this case, mechanical stoppers can be omitted.

Figure 9:
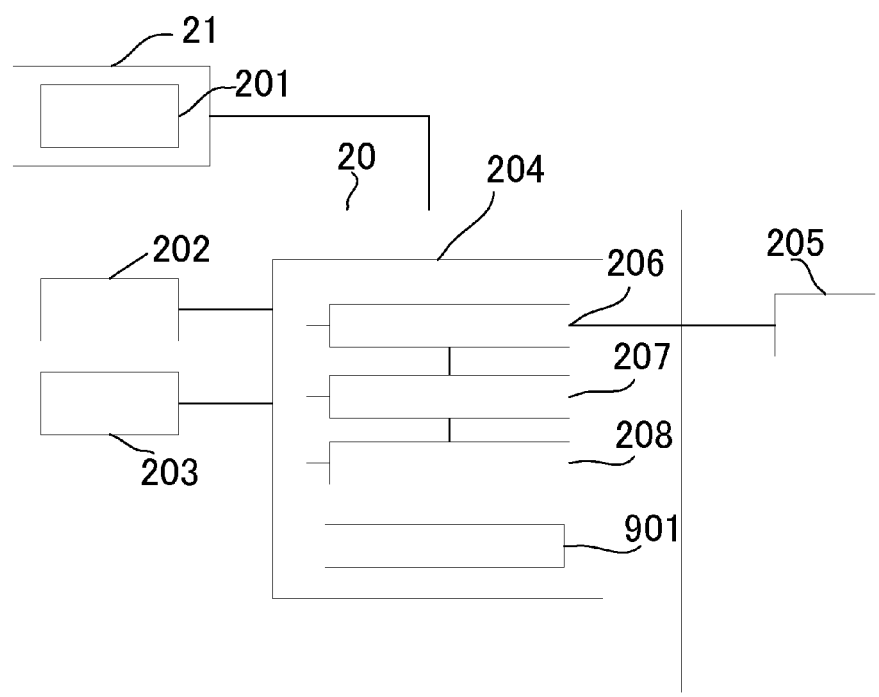
FIG. 9 is a block diagram illustrating a mechanism implementing a method for limiting movement of the axes of a robot according to a third embodiment.

Other configuration of the third embodiment is illustrated in FIG. 9. FIG. 9 is a diagram describing an embodiment in which the apparatus configured to perform the monitoring and stop control operations described above limits movement of each axis.

A next target position calculator 206 calculates a next target position. An axis movement range limitation monitoring unit 901 checks whether or not each axis at the calculated next target position will move beyond the movable range 60 of the axis. Further, when the robot 1 is stopped due to an emergency stop while moving to the next target position, a post-coasting-predicted-position calculator 207 calculates an angle of each axis (predicted coasting angle) for which the axis will coast and then stop to calculate a post-coasting predicted position. The axis movement range limitation monitoring unit 901 checks whether or not each of the axes at the determined post-coasting predicted position will move beyond the movable range 60 of the axis. The next target position calculator 206 sends command values for the respective axes of the robot 1 for moving the robot 1 to the calculated position to a driver 205. However, if the axis movement range limitation monitoring unit 901 detects potential movement of each axis beyond the movable range 60 of the axis, a stop request is sent to the driver 205.

The driver 205 causes the axes of the robot 1 to move in accordance with the command values sent from the movement command generator 204. However, upon receipt of a stop request, the driver 205 does not permit the robot 1 to move but shuts down the drive power supply to cause the robot 1 to stop.

The movable ranges 60 of the respective axes of the robot 1 are also stored in a teaching data storage area 202.

The movable ranges 60 of the respective axes of the robot 1 are set before the operation of the robot 1 which has been installed and placed in position. The movable ranges 60 of the respective axes may be set any time when changed in addition to when the robot 1 is placed in position. The movable ranges 60 of the respective axes are defined using maximum movement angles and minimum movement angles of the respective axes and are set. The setting of the movable ranges 60 may be performed by inputting the numerical values of the movable ranges 60 of the respective axes using a teach pendant 21, or by operating the teach pendant 21 to move the control points of the robot 1 and specifying the current angles of the axes. Alternatively, data for setting the movable ranges 60 of the respective axes may also be loaded into a controller 20 from the teach pendant 21 using a personal computer or the like. The defined movable ranges 60 of the respective axes are stored in the memory of the controller 20. A plurality of types of movable ranges 60 of each axis may also be defined.

Figure 10:
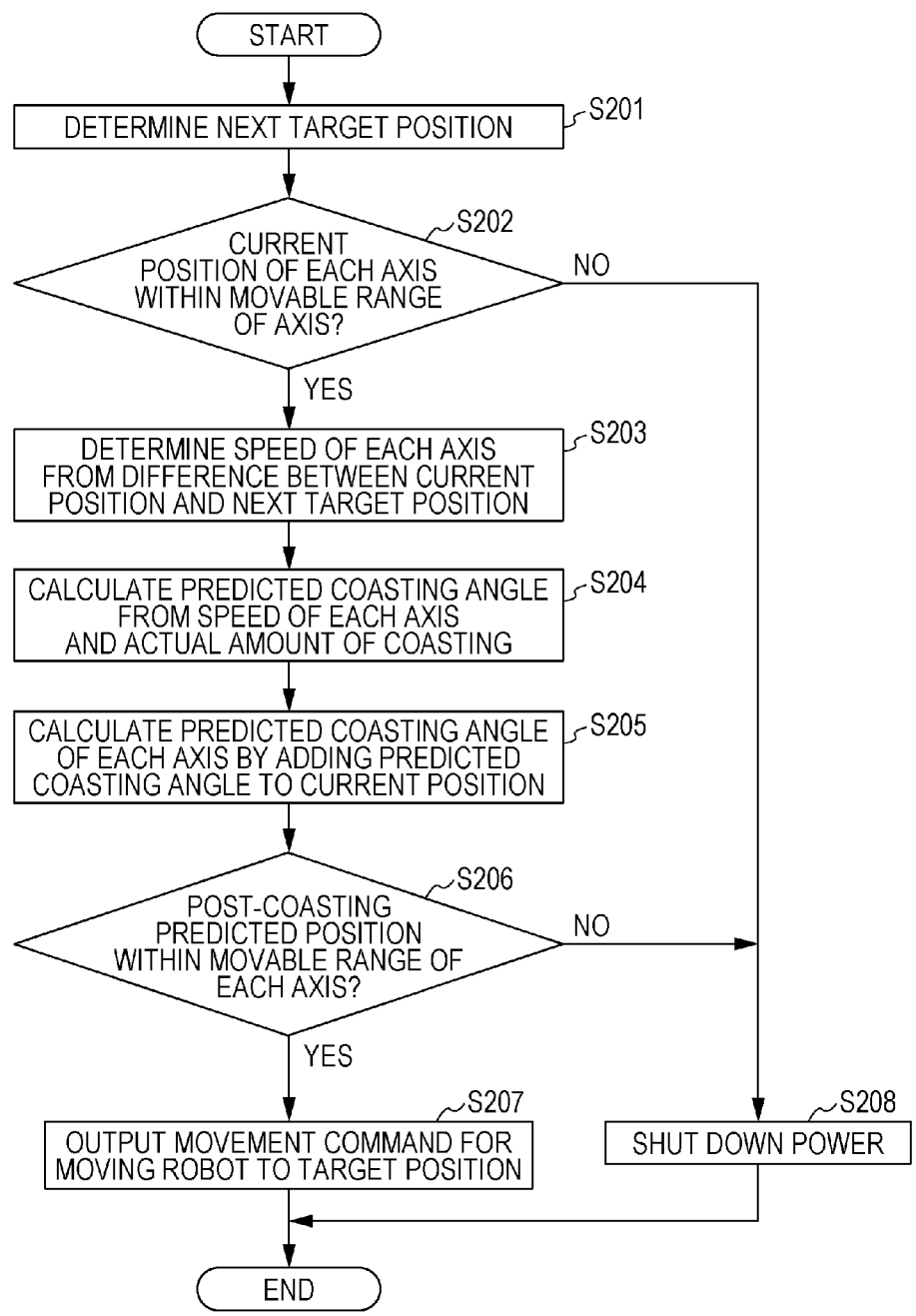
FIG. 10 is a flowchart illustrating the method for limiting movement of the axes of a robot according to the third embodiment.

FIG. 10 is a flowchart of a process for limiting movement of the robot 1 so that the respective axes of the robot 1 do not move beyond the movable ranges thereof in the system configuration illustrated in FIG. 9. A method according to the third embodiment will be described step by step with reference to FIGS. 9 and 10.

In step S201, the next target position calculator 206 calculates a next target position (302 in FIGS. 3A and 3B) for each calculation period. The next target position also includes the angle of each axis of the robot 1. Then, the process proceeds to step S202.

In step S202, it is checked whether or not the current position of each axis will be within the movable range of the axis at the next target position determined in step S201. The check operation is performed by the axis movement range limitation monitoring unit 901. If the current position of each axis is larger than the maximum value or smaller than the minimum value of the movable range of the axis, range abnormality is determined. If range abnormality is determined, the process proceeds to step S208, and the power is shut down. Otherwise, the process proceeds to step S203.

If the movable range of each axis is defined using a plurality of regions, a similar check operation is performed for each of the movable ranges of axes set active to monitor. If the current position of each axis is outside even one of the movable ranges, "range abnormality" is determined.

If "range abnormality" is determined, the process proceeds to step S208, and the power is shut down. Otherwise, the process proceeds to step S203.

In step S203, the speed $\omega_i$ of each axis of the robot 1 is determined from the difference between the current position and the next target position and from the calculation period time t. A speed calculation method that is the same as or similar to that in step S03 according to the first embodiment may be used.

In step S204, the post-coasting-predicted-position calculator 207 calculates the amount of coasting of each axis of the robot 1 at the next target position. A calculation method that is the same as or similar to that in step S04 according to the first embodiment may be used.

In step S205, the coasting angles of the respective axes, which are determined in step S204, are added to the current position to calculate "predicted coasting angles of the respective axes".

In step S206, it is checked whether or not the "predicted coasting angles of the respective axes" are within the movable ranges of the respective axes. The check operation may be performed by the axis movement range limitation monitoring unit 901 using a method similar to that in step S202.

If "range abnormality" is determined, the process proceeds to step S208, and the power is shut down. Otherwise, the process proceeds to step S207.

In step S207, a movement command for moving the robot 1 to the next target position calculated by the next target position calculator 206 is output to the driver 205 to make the robot 1 move.

In step S208, the axis movement range limitation monitoring unit 901 sends a stop request to the driver 205. In response to the stop request, the driver 205 makes the robot 1 stop moving. Further, a message indicating the reason for making the robot 1 stop is displayed on a display of the teach pendant 21.

With the above procedure, even when an emergency stop occurs and the robot 1 coasts, the robot 1 can be prevented from moving beyond the movable ranges of the respective axes.

Fourth Embodiment

The method for limiting movement of a robot according to the third embodiment may be implemented by a control program for controlling the robot. In order to enhance security and reliability, an apparatus configured to monitor contact between a robot and a virtual safety protection barrier and to control the robot to stop moving when the robot will come into contact with the virtual safety protection barrier may be independently provided.

The configuration of a fourth embodiment in which the apparatus configured to perform the above monitoring and stop control operations limits movement of each axis will be described with reference to FIG. 11.

Figure 11:
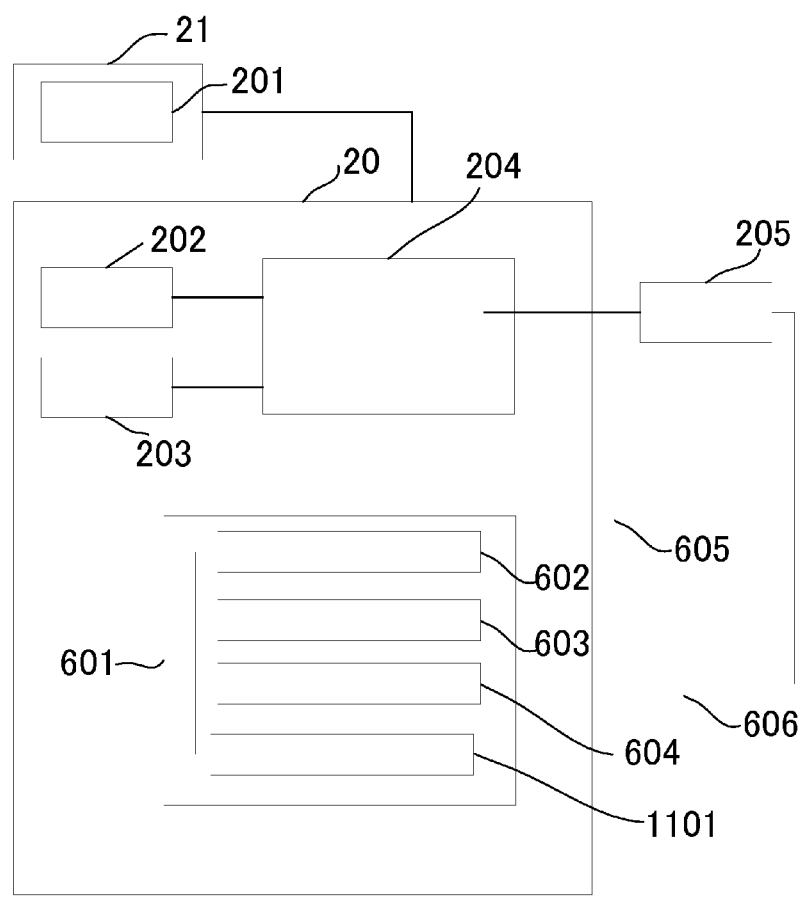
FIG. 11 is a block diagram illustrating a mechanism implementing a method for limiting movement of the axes of a robot according to a fourth embodiment.

FIG. 11 illustrates a configuration in which an axis movement range limitation monitoring unit 1101 is added to the system illustrated in FIG. 6.

In the movement region monitoring apparatus 601, the current position detector 602 reads motor positions 605 of the respective axes for each determined monitoring period, which are supplied from the driver 205, and determines the current position of the robot 1 (the position of the workpiece 9 or the tool 7) from the motor positions 605. The axis movement range limitation monitoring unit 1101 checks whether or not the robot 1 will move beyond the movable ranges of the respective axes at the current position. The coasting-based-predicted-position calculator 603 calculates, based on information regarding the motor positions 605 read by the current position detector 602, an angle of each axis for which the axis will coast and then stop when the robot 1 is stopped due to an emergency stop at this time. The axis movement range limitation monitoring unit 1101 checks whether or not the calculated predicted coasting angles are outside the movable ranges of the respective axes.

Upon detection of movement range abnormality of each axis, the axis movement range limitation monitoring unit 1101 outputs an emergency stop command 606 such as a drive power supply shutdown signal to the driver 205.

Figure 12:
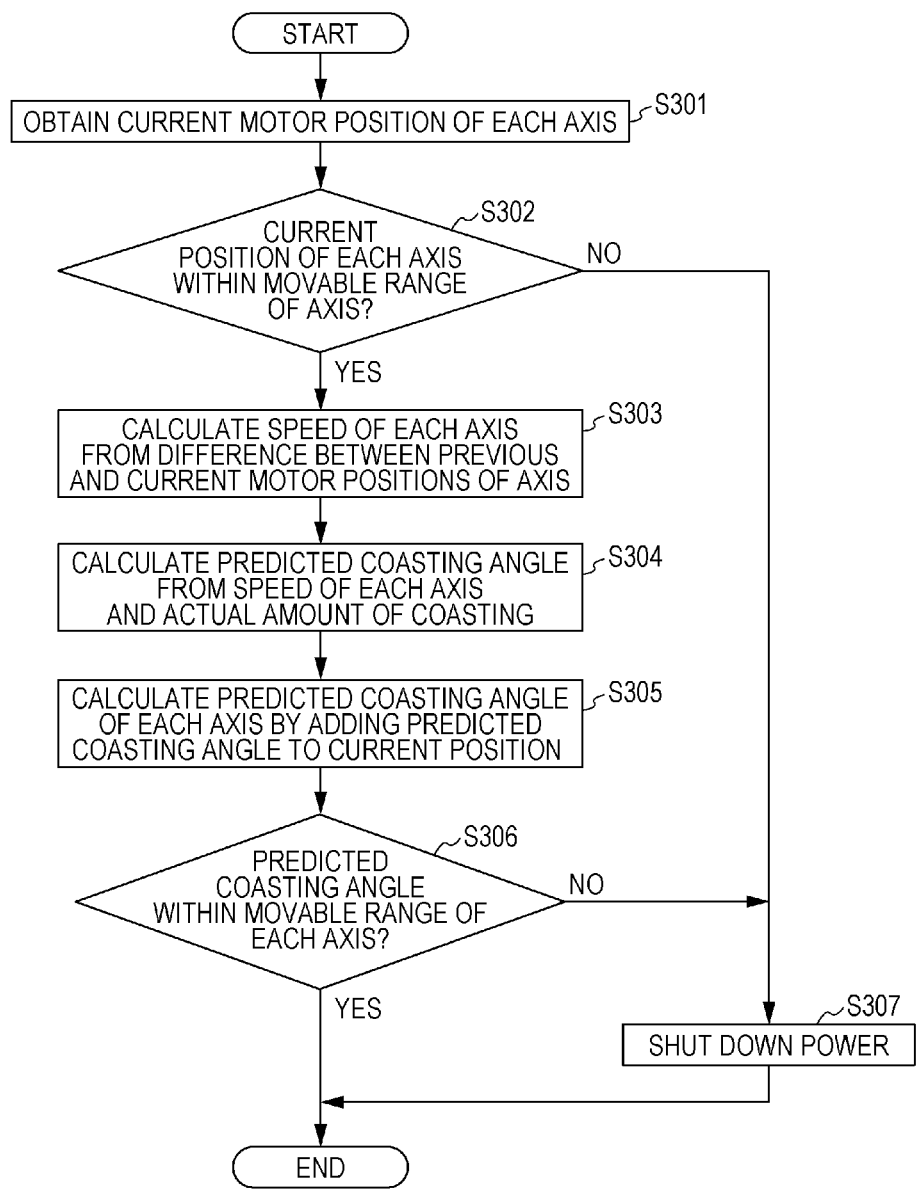
FIG. 12 is a flowchart illustrating the method for limiting movement of the axes of a robot according to the fourth embodiment.

FIG. 12 is a flowchart of a process for limiting movement of the robot 1 so that the respective axes of the robot 1 do not move beyond the movable ranges thereof in the system configuration illustrated in FIG. 11. A method according to the fourth embodiment will be described step by step with reference to FIG. 12.

In step S301, the current position detector 602 reads the motor positions 605 of the respective axes of the robot 1, and then determines the current position of the robot 1 from the read motor positions 605. For subsequent processing, the current positions of the motors of the respective axes (current position) are stored together with the previous positions that have been read in the previous operation. Then, the process proceeds to step S302.

In step S302, the axis movement range limitation monitoring unit 1101 checks whether or not the current position of each axis is within the movable range of the axis when the robot 1 is at the current position determined in step S301. If the current position of each axis is larger than the maximum value or smaller than the minimum value of the movable range of the axis, "range abnormality" is determined. If range abnormality is determined, the process proceeds to step S307, and the power is shut down. Otherwise, the process proceeds to step S303.

In step S303, the speed $\omega_i$ of each axis of the robot 1 is determined from the difference between the previous position and the current position of the motor of the axis and from the monitoring period time. The index i represents the axis number of each axis. Then, the process proceeds to step S304.

In step S304, the coasting angles of the respective axes relative to the current positions of the motors of the respective axes when the robot 1 is stopped due to an emergency stop are calculated. The calculation of the coasting angles is performed by the coasting-based-predicted-position calculator 603. A method that is the same as or similar to that in step S04 in FIG. 4 may be used. Then, the process proceeds to step S305.

In step S305, the coasting angles of the respective axes determined in step S304 are added to the current positions of the motors of the respective axes to calculate "predicted coasting angles of the respective axes". The calculation of the predicted coasting angles is performed by the coasting-based-predicted-position calculator 603. A calculation method that is the same as or similar to that in step S05 in FIG. 4 may be used. Then, the process proceeds to step S306.

In step S306, it is checked whether or not the "predicted coasting angles of the respective axes" are within the movable ranges of the axes. A check method that is the same as or similar to that in step S302 may be performed. If "range abnormality" is determined, the process proceeds to step S307, and the power is shut down. Otherwise, the monitoring process in the current monitoring period ends.

In step S307, an emergency stop request is sent to the driver 205. With the above configuration and procedure, if an abnormality command is transmitted to the robot 1 due to the failure of the movement command generator 204, the robot 1 can be stopped without allowing the respective axes of the robot 1 to move beyond the movable ranges thereof after coasting.

While in this embodiment, the description has been given of movement monitoring in place of the use of a safety barrier, the embodiment is merely an example. The concept of the embodiment can also be applied to movement of a robot while moving to a living space, and is not limited to the application to industrial robots.

What is claimed as new and is desired to be secured by Letters Patent of the United States is:

1. A robot system comprising:
   a robot, the robot having an arm, the arm having an axis; and
   a virtual safety protection barrier with which an arm-occupied region is not allowed to come into contact, the arm-occupied region including the arm of the robot,
   wherein, when a target position of a tip of the robot is calculated for each calculation period and a movement command for moving the axis of the arm of the robot is generated, it is checked whether or not the arm-occupied region at a target position of the tip of the robot in a subsequent calculation period will come into contact with the virtual safety protection barrier,
   wherein, if it is determined that the arm-occupied region will come into contact with the virtual safety protection barrier at the target position of the tip of the robot in the subsequent calculation period, then control is performed to cause the robot to stop moving before the robot begins movement from an initial position of the tip of the robot in the subsequent calculation period toward the target position of the tip of the robot in the subsequent calculation period, and
   wherein, if it is determined that the arm-occupied region will not come into contact with the virtual safety protection barrier at the target position of the tip of the robot in the subsequent calculation period, then a coasting angle of the axis of the arm of the robot is estimated from an actual coasting angle measured in advance and from a mechanical delay time, the coasting angle being an angle for which the axis of the arm of the robot will coast when the robot is commanded to stop while at the target position of the tip of the robot in the subsequent calculation period due to an emergency stop during movement of the robot in accordance with a movement command for moving the tip of the robot to the target position in the subsequent calculation period, and a post-coasting predicted position of the axis of the arm of the robot is determined by adding a coasting angle of the axis to the movement command for moving the axis in the subsequent calculation period, the post-coasting predicted position of the axis being a position at which the axis of the arm of the robot is predicted to stop after coasting.

2. The robot system according to claim 1,
wherein the post-coasting predicted position of the axis of the arm of the robot is determined by adding a coasting angle of the axis to the movement command for moving the axis in the subsequent calculation period, and it is estimated whether or not the arm-occupied region at the post-coasting predicted position of the axis will come into contact with the virtual safety protection barrier, and
wherein, if it is determined that the arm-occupied region will come into contact with the virtual safety protection barrier, then control is performed to cause the robot to stop moving.

3. The robot system according to claim 1,
wherein the coasting angle of the axis of the arm of the robot, which is an angle for which the axis of the arm of the robot will coast when the robot is stopped due to an emergency stop during the movement of the robot, is estimated from an actual coasting angle measured in advance and from a mechanical delay time,
wherein the post-coasting predicted position of the axis of the arm of the robot is determined by adding the estimated coasting angle of the axis to the movement command for moving the axis in the subsequent calculation period,
wherein it is estimated whether or not the post-coasting predicted position of the axis is within a movable range of the axis, and
wherein, if the post-coasting predicted position of the axis is outside the movable range, then control is performed to cause the robot to stop moving.

4. The robot system according to claim 1,
wherein the coasting angle of the axis of the arm of the robot, which is an angle for which the axis of the arm of the robot will coast when the robot is stopped due to an emergency stop during the movement of the robot, is estimated from an actual coasting angle measured in advance and from a mechanical delay time,
wherein the post-coasting predicted position of the axis of the arm of the robot is determined by adding the actual coasting angle of the axis to the movement command for moving the axis in the subsequent calculation period,
wherein it is estimated whether or not the arm-occupied region at the post-coasting predicted position of the axis will come into contact with the virtual safety protection barrier, and
wherein, if it is determined that the arm-occupied region will come into contact with the virtual safety protection barrier, then control is performed to cause the robot to stop moving.

5. A robot system comprising:
a robot, the robot having a joint axis, the joint axis being movable in a defined movable range,
wherein, when a target position of a tip of the robot is calculated for each calculation period and a movement command for moving the joint axis of the robot is generated, it is estimated whether or not a movement command value for the joint axis in a subsequent calculation period is within the movable range,
wherein, if the movement command value for the joint axis in the subsequent calculation period is outside the movable range, then control is performed to cause the robot to stop moving before the robot begins movement from an initial position of the tip of the robot in the subsequent calculation period toward a target position of the tip of the robot in the subsequent calculation period, and
wherein, if the movement command value for the joint axis in the subsequent calculation period is within the movable range, then a coasting angle of the joint axis of the robot is estimated from an actual coasting angle measured in advance and from a mechanical delay time, the coasting angle being an angle for which the joint axis of the robot will coast when the robot is commanded to stop while at the target position of the tip of the robot in the subsequent calculation period due to an emergency stop during movement of the robot in accordance with a movement command for moving the tip of the robot to the target position in the subsequent calculation period, and a post-coasting predicted position of the joint axis of the robot is determined by adding the coasting angle of the joint axis to the movement command for moving the joint axis in the subsequent calculation period, the post-coasting predicted position of the joint axis being a position at which the joint axis of the robot is predicted to stop after coasting.

6. The robot system according to claim 5,
wherein the post-coasting predicted position of the joint axis of the robot is determined by adding the coasting angle of the joint axis to the movement command for moving the joint axis in the subsequent calculation period, and it is estimated whether or not the post-coasting predicted position of the joint axis will be within the movable range, and
wherein, if the post-coasting predicted position of the joint axis will be outside the movable range, then control is performed to cause the robot to stop moving.

7. A manufacturing method using a robot system, comprising:
providing a robot having a plurality of joint axes, and a safety protection barrier arranged around the robot, the robot performing an operation inside the safety protection barrier;
providing a controller configured to determine whether or not the robot will come into contact with the safety protection barrier during the operation at a target position of the robot in a subsequent calculation period; and
causing the robot to stop moving before the robot begins movement from an initial position of the robot in the subsequent calculation period toward the target position of the robot in the subsequent calculation period if the controller determines that the robot will come into contact with the safety protection barrier.

8. The manufacturing method using a robot system according to claim 7, wherein the controller is provided with the functions of
estimating a coasting angle of each of the joint axes of the robot from an actual coasting angle measured in advance and from a mechanical delay time if the robot is commanded to stop while at the target position of the robot in the subsequent calculation period, and
determining a post-coasting predicted position of each of the joint axes of the robot by adding the coasting angle of the joint axis among the joint axes to a movement command for moving the joint axis in the subsequent calculation period, the post-coasting predicted position of each of the joint axes of the robot being a position at which the joint axis is predicted to stop after coasting.

9. The manufacturing method using a robot system according to claim 7,
wherein, when a target position of a tip of the robot is calculated for each calculation period and a movement command for moving each of the joint axes of the robot is generated, the controller estimates whether or not a movement command value for each of the joint axes in a subsequent calculation period is within a movable range of the joint axis.

10. The robot system according to claim 1,
wherein, if it is determined that the arm-occupied region will not come into contact with the virtual safety protection barrier at the target position of the tip of the robot in the subsequent calculation period based on the determined post-coasting predicted position, then the movement command is output to begin movement from the initial position of the tip of the robot in the subsequent calculation period toward the target position of the tip of the robot in the subsequent calculation period.

11. The robot system according to claim 5,
wherein, if it is determined that the movement command value for the joint axis in the subsequent calculation period is within the movable range based on the determined post-coasting predicted position, then the movement command is output to begin movement from the initial position of the tip of the robot in the subsequent calculation period toward the target position of the tip of the robot in the subsequent calculation period.

12. The manufacturing method using a robot system to claim 7,
wherein, if it is determined that the robot will not come into contact with the safety protection barrier at the target position of the robot in the subsequent calculation period, then:
estimating a coasting angle of the axis of the arm of the robot from an actual coasting angle measured in advance and from a mechanical delay time, the coasting angle being an angle for which the axis of the arm of the robot will coast when the robot is commanded to stop while at the target position of the tip of the robot in the subsequent calculation period due to an emergency stop during movement of the robot in accordance with a movement command for moving the robot to the target position in the subsequent calculation period; and
determining a post-coasting predicted position of the axis of the arm of the robot by adding a coasting angle of the axis to the movement command for moving the axis in the subsequent calculation period, the post-coasting predicted position of the axis being a position at which the axis of the arm of the robot is predicted to stop after coasting.

13. The manufacturing method using a robot system to claim 12, wherein, if it is determined that the robot will not come into contact with the safety protection barrier at the target position of the robot in the subsequent calculation period based on the determined post-coasting predicted position, then the movement command is output to begin movement from the initial position of the robot in the subsequent calculation period toward the target position of the he robot in the subsequent calculation period.

14. A robot system comprising:
a robot having an arm, the arm having an axis; and
a virtual safety protection barrier with which an arm-occupied region is not allowed to come into contact, the arm-occupied region including the arm of the robot,
wherein an actual amount of coasting ($\theta_{DiMAX}$) obtained when a robot, which holds at least a maximum load, is stopped due to an emergency stop at a maximum speed ($\omega_{iMAX}$) of each axis under the maximum load is measured in advance using an actual robot system and stored,
wherein, when a target position of a tip of the robot is calculated for each calculation period and a movement command for moving the axis of the arm of the robot is generated, it is checked whether or not the arm-occupied region at a target position of the tip of the robot in a subsequent calculation period will come into contact with the virtual safety protection barrier,
wherein, if it is determined that the arm-occupied region will come into contact with the virtual safety protection barrier, then control is performed to cause the robot to stop moving, and
wherein, if it is determined that the arm-occupied region will not come into contact with the virtual safety protection barrier, then:
a speed of each axis is calculated by dividing a difference between a current position and a next target position by a calculation period time;
a variable coasting angle is calculated by multiplying the actual amount of coasting by a value obtained by dividing the speed of each axis by the maximum speed of each axis;
an amount of fixed-delay coasting is calculated by multiplying the speed of each axis by a fixed delay time which is preset as a mechanical delay time;
a coasting angle of each axis of the arm of the robot is estimated by adding the variable amount of coasting to the amount of fixed-delay coasting, the coasting angle being an angle for which the axis of the arm of the robot will coast when the robot is stopped due to an emergency stop during movement of the robot in accordance with a movement command for moving the tip of the robot to the target position in the subsequent calculation period; and
a post-coasting predicted position of each axis of the arm of the robot is determined based on the coasting angle of each axis and an operation command of each axis in a next calculation period time,
wherein it is estimated whether or not the arm-occupied region at the post-coasting predicted position of each axis will come into contact with the virtual safety protection barrier, and, if it is determined that the arm-occupied region will come into contact with the virtual safety protection barrier, control is performed to cause the robot to stop moving.

* * * * *